United States Patent [19]

Lockett

[11] Patent Number: 5,020,651
[45] Date of Patent: Jun. 4, 1991

[54] LAUNDRY CHUTE

[76] Inventor: Stephen Lockett, 2422 Goodison Ave., Mississauga, Canada, L5B 2A1

[21] Appl. No.: 466,909

[22] Filed: Jan. 18, 1990

Related U.S. Application Data

[63] Continuation-in-part of Ser. No. 238,794, Aug. 31, 1988, abandoned.

[30] Foreign Application Priority Data

Jun. 22, 1988 [CA] Canada ................. 570164

[51] Int. Cl.$^5$ ............................... B65G 11/10
[52] U.S. Cl. ................... 193/25 R; 193/33; 193/2 A; 193/25 C; 232/44; 52/195
[58] Field of Search .............. 193/1, 2 R, 2 A, 2 L, 193/2 D, 3, 8, 25 R, 25 A, 25 E, 255, 256, 33, 34; 209/375; 232/44, 43.2; 52/195, 197; 312/242, 247

[56] References Cited

U.S. PATENT DOCUMENTS

| 263,952 | 9/1882 | Penn | 193/25 R X |
|---|---|---|---|
| 1,004,268 | 9/1911 | Jackson | 193/33 |
| 1,719,545 | 7/1929 | Grapp | 193/33 |
| 1,822,530 | 9/1931 | Kind | 193/25 R |
| 2,297,544 | 9/1942 | Elwood | 193/25 L |
| 3,583,748 | 6/1971 | Arndt | 193/256 L X |
| 3,684,072 | 8/1972 | Castrellon | 193/25 R X |
| 3,893,615 | 7/1975 | Johnson | 232/43.2 |
| 4,778,031 | 10/1988 | Luriel | 193/25 R X |

FOREIGN PATENT DOCUMENTS

| 2468707 | 5/1981 | France | 52/195 |
|---|---|---|---|
| 2482162 | 11/1981 | France | 52/195 |
| 2606811 | 5/1988 | France | 193/2 R |

Primary Examiner—Robert P. Olszewski
Assistant Examiner—James R. Bidwell
Attorney, Agent, or Firm—Moss, Barrigar & Oyen

[57] ABSTRACT

A chute is disclosed for passing articles such as laundry between floors or walls in a building. The chute has a tubular frame to be securely inserted in an opening in a planar partition, and a flexible tube attached to and hanging from the frame. The tubular frame has a peripheral wall defining an inlet in communication with one side of the planar partition and an outlet extending beyond the other side of the planar partition. A peripheral flange is outwardly directed from the peripheral wall adjacent to the inlet and is adapted to rest against one side of the planar partition. A gripping projection extends transversely from the peripheral wall and is spaced from the other side of the planar partition. The flexible tube is releasably attached to the gripping projection. A lid is movably connected to the frame to open and close the inlet.

14 Claims, 3 Drawing Sheets

LAUNDRY CHUTE

BACKGROUND OF THE INVENTION

This application is a Continuation-In-Part application of U.S. patent application, Ser. No. 238,794 filed Aug. 31, 1988, now abandoned.

FIELD OF INVENTION

This invention relates to laundry chutes which permit the passage of laundry or similar subject matter through a partition, typically from one floor of a building to the floor below.

STATEMENT OF INVENTION

According to the present invention, there is provided a chute for use in an opening in a planar partition, comprising a tubular frame adapted to be securely inserted into said opening, having a peripheral wall defining an inlet in communication with one side of the partition and an outlet extending from the other side of the partition. A peripheral flange is outwardly directed from the peripheral wall adjacent to the inlet and contacts the partition to prevent the frame from passing through the partition. A gripping projection extends transversely around the peripheral wall and is spaced from the partition other side. A flexible tube with an open end portion is slid onto the frame covering the gripping projection. Attaching means brings the flexible tube open end portion into engagement with the gripping projection. Attaching means includes a sleeve formed in the open end portion of the tube and a flexible attaching member threaded therethrough. Planar closure means is movably connected to said frame proximate said inlet, for selectively covering and exposing said inlet.

BRIEF DESCRIPTION OF THE DRAWINGS

A preferred embodiment of the invention will now be described in conjunction with the accompanying drawings, in which.

DETAILED DESCRIPTION OF THE PREFERRED EMBODIMENT

Figure 1:
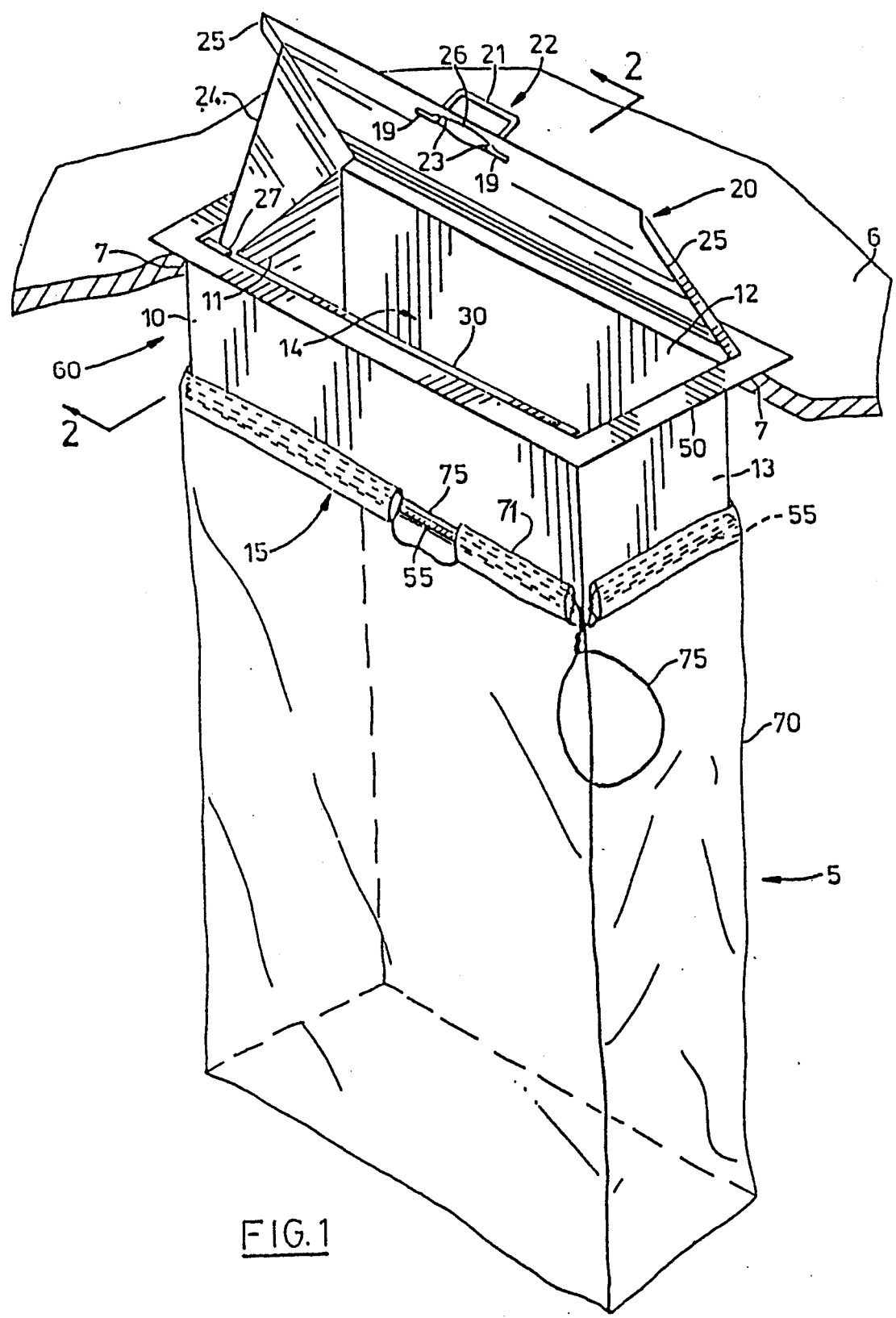
FIG. 1 is a perspective view of a chute inserted into a floor opening, which is partially broken away for clarity.

Referring to FIG. 1, chute 5 is basically a metallic tubular frame 60 with a flexible tube 70 connected thereto. In use, frame 60 is inserted into an opening 7 of floor 6 to permit passage of laundry or other subject matter therethrough, from which tube 70 hangs down to direct the laundry or other subject matter after said passage.

More particularly, frame 60 is a four walled rectangular structure, with walls 10, 11, 12 and 13 defining a top inlet 14 and bottom outlet 15. There is an upper peripheral flange 50 extending outwardly from the top of walls 10, 11, 12 and 13, which prevents chute 5 from passing through opening 7.

A lower peripheral flange 55 extends outwardly from the bottom of walls 10, 11, 12 and 13. One open end portion of tube 70 releasably encloses outlet 15. A sleeve 71 is formed in the top of tube 70 and a flexible attaching member preferably draw string 75 is threaded therethrough. Draw string 75 releasably encloses outlet 15 by being drawn around walls 11, 12, 13 and 14 above flange 55 as shown in FIG. 1.

Figure 3:
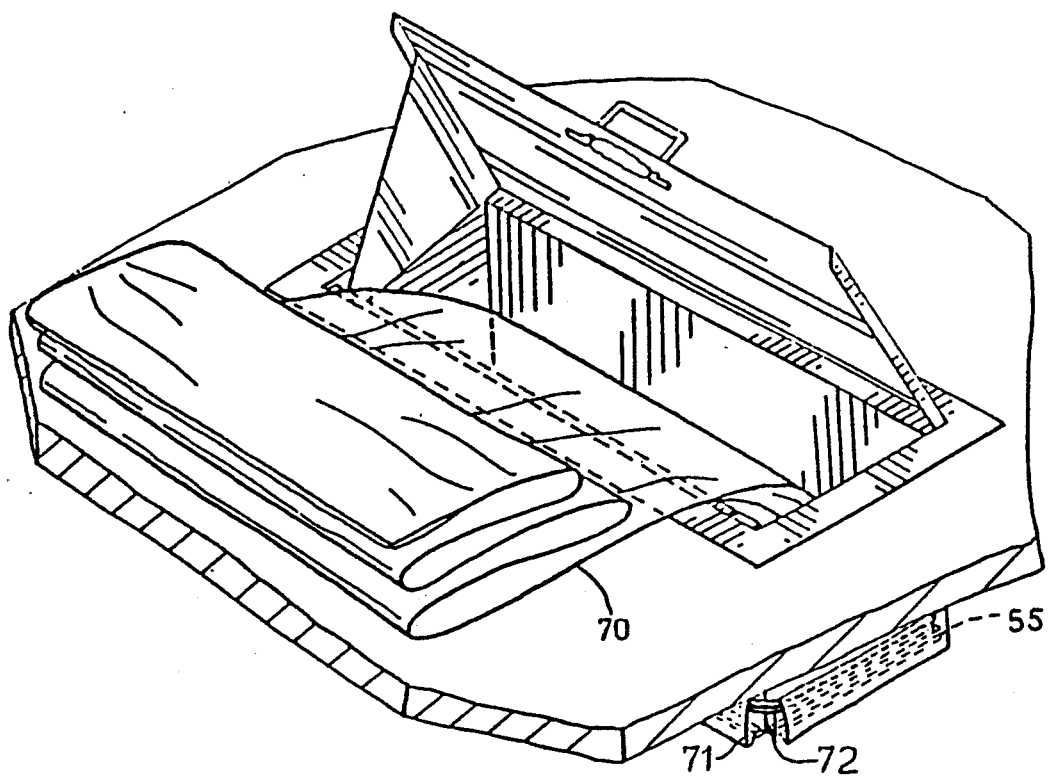
FIG. 3 is a perspective view of an alternate embodiment of the chute with the tube drawn up.

In an alternate embodiment, alternate flexible attaching member, elastic material 72 (see FIG. 3) is threaded through sleeve 71. Elastic material 72 is dimensioned such that it can stretch over lower peripheral flange 55 and then tightens around walls 11, 12, 13 and 14 above peripheral flange 55 as shown in FIG. 3.

Figure 2:
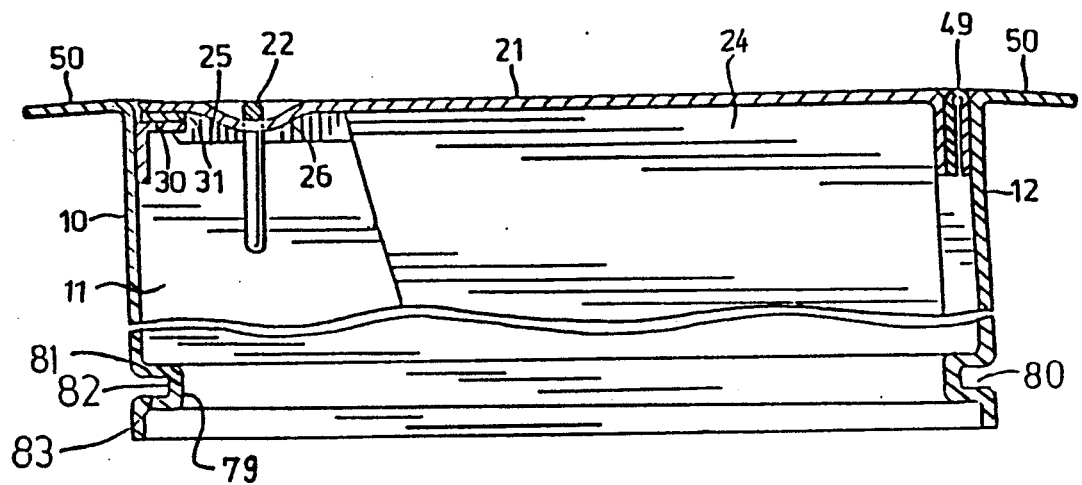
FIG. 2 is a partial cross-sectional side view of an alternate embodiment of the chute in closed position, taken along the lines 2—2 of FIG. 1.

In an alternate embodiment shown in FIG. 2, a protrusion 79 having an upper wall 81, an inside wall 82 and a lower wall 83 extends inwardly around walls 11, 12, 13 and 14 and provides a groove 80 into which draw string 75 or elastic material 72 can be tightened.

Figure 4:
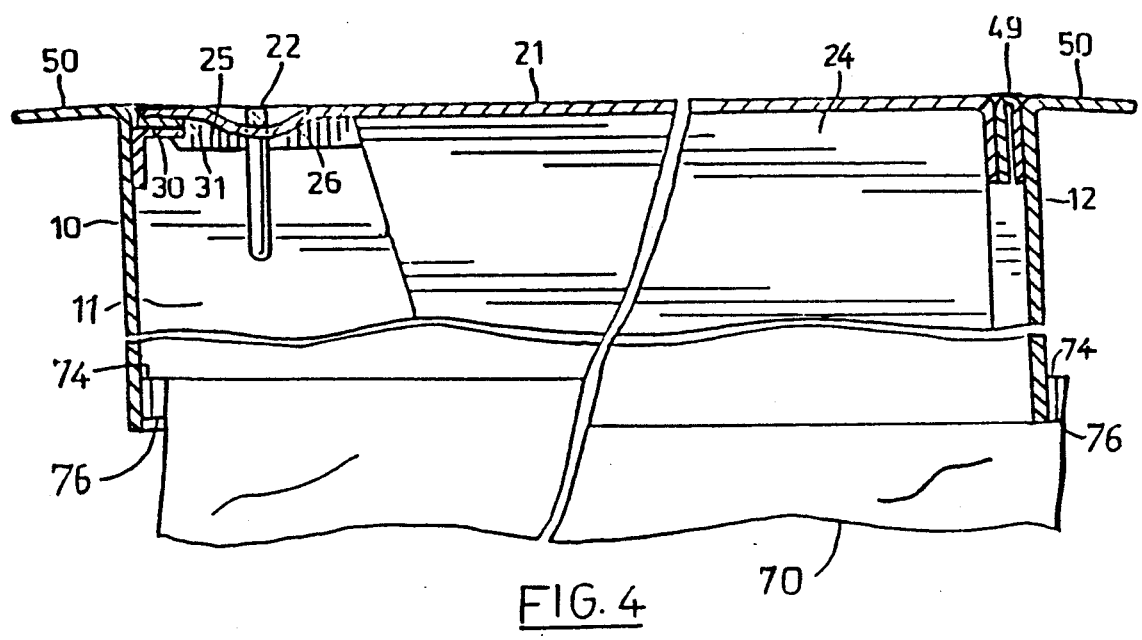
FIG. 4 is a partial cross-sectional side view of an alternate embodiment of the chute, taken along the lines 2—2 of FIG. 1.

In an alternate embodiment shown in FIG. 4, one half of a hook and loop type fastener 74 sold under the trade mark VELCRO can be attached to the lower edge of walls 11, 12, 13 and 14. The other or companion half of the hook and loop type fastener 76 is attached to the upper or open end portion of tube 70. The hook and loop type fasteners can be attached to the outside of walls 11, 12, 13 and 14 as shown in the right hand portion of FIG. 4 or they can be attached to the inside as shown in the left hand portion of FIG. 4.

There is a lid 20 forming a planar closure means, a handle 22 and a stop member 24 organized as follows.

Handle 22 is an elongate bar 21 with end portions 19 inserted into bores 23 of lid 20 and then bent hookwise to prevent escape of handle 22 from lid 20. Bores 23 are dimensioned to permit handle 22 to slide down into a rest position under the force of gravity (as seen in FIG. 2) and also to permit the user to grasp and lift handle 22 (as seen in FIG. 1).

Lid 20 is flat, with downwardly extending side flanges 25, but has an elongate depression 26 adapted to seat the elongate bar 21 of handle 22 intermediate its bent end portions 19. Lid 20 is hingedly connected, by conventional piano hinge 49, to the top of the inner side of wall 12 and is movable between a closed position, where lid 20 is flush with flange 50 and inlet 14 is covered, and an exposed position, which is described in more detail below. Depending inwardly from wall 10 opposite hinge means 49 is a ledge 30 and resilient pad 31 thereupon, dimensioned and disposed so that when lid 20 rests thereupon, lid 20 is flush with flange 50.

Triangular stop member 24 is rigidly connected to the underside of lid 20 along the inner side of flange 25 and is dimensioned so that when lid 20 is moved into the open position, a distal end 27 butts against the inner side of wall 10, opposite wall 12, before lid 20 reaches a vertical position where it might remain in the open position by itself. In this way, exposure of inlet 14 is restricted to the desired extent, and lid 20 is biased by gravity into the closed position, where it will not present a danger to children or pets.

The length of tube 70 is dimensioned so that it effectively directs laundry or other subject matter into a receptacle (not shown), which may be a laundry basket or other receptacle aligned below the other end of tube 70. Tube 70 is preferably flexible plastic which can be easily drawn up manually and packed within frame 60 (held by friction, pins or other suitable method), or folded on floor 6 as illustrated in FIG. 3, so that tube 70 may be hidden from view in the lower floor when chute 5 is not in use.

Opening 7 in floor 6 may be created by conventional methods as are known to builders and craftsmen.

Frame 60, stop member 24, handle 22 and lid 20 may be made of metal, plastic or other material with sufficient rigidity as are known to those skilled in the art. Frame 60 may be cylindrical in plan view with only minor adjustments necessary to stop member 24, lid 20 and hinge means 49. Instead of insertion into an opening in the floor, frame 60 may be inserted into an opening in an upstanding wall, wherein tube 70 hangs down toward the desired receptacle. Tube 70 may be made of cloth.

I claim:

1. A chute for use in an opening in a planar partition, comprising:
 a tubular frame, adapted to be securely inserted into said opening, having a peripheral wall defining an inlet in communication with one side of the partition, and an outlet extending from the other side of the partition;
 a peripheral flange outwardly directed from said peripheral wall adjacent to said inlet, said flange contacting said partition to prevent said frame from passing through the partition;
 a gripping projection extending transversely around said peripheral wall and spaced from said partition other side;
 a flexible tube having an open end portion adapted to be slid onto said frame over said gripping projection;
 attaching means located on said flexible tube end portion for bringing said flexible tube end portion into engagement with said gripping projection to releasably attach the tube to the frame, said attaching means being a sleeve formed in the open end portion of said tube and a flexible attaching member threaded therethrough; and
 planar closure means, movably connected to said frame proximate said inlet, for selectively covering and exposing said inlet.

2. A chute as claimed in claim 1 wherein said gripping projection is in the form of a peripheral flange extending outwardly from said peripheral wall adjacent to said outlet.

3. A chute according to claim 2 wherein said flexible attaching member is a draw string for constricting the open end portion of the said tube when tightened, said draw string being adapted to be located between said peripheral flange and said partition to prevent the open end portion of the tube from sliding off the tubular frame.

4. A chute according to claim 2 wherein said flexible attaching member is an elastic member for constricting the open end portion of the said tube, said elastic member being adapted to be located between said peripheral flange and said partition to prevent the open end portion of the tube from sliding off the tubular frame.

5. A chute as claimed in claim 1 wherein said gripping projection is a protrusion having an upper wall, an inside wall and a lower wall, said protrusion extending inwardly from said peripheral wall to form an inwardly disposed peripheral groove in said wall.

6. A chute according to claim 5 wherein said flexible attaching member is a draw string for constricting the open end portion of the said tube when tightened, said draw string being adapted to be located in said groove to prevent the open end portion of the tube from sliding off the tubular frame.

7. A chute according to claim 5 wherein said flexible attaching member is an elastic member for constricting the open end portion of the tube, said elastic member being adapted to be located in said groove to prevent the open end portion of the tube from sliding off the tubular frame.

8. A chute according to claim 1, wherein said closure means has stop means for restricting movement thereof and preventing said closure means from reaching a vertical position.

9. A chute according to claim 8 wherein said closure means has an outwardly facing face, and further comprising a handle movably connected to said closure means, said closure means further comprising means for seating said handle in a generally flush relationship with said outward facing face of said closure means.

10. A chute according to claim 1 wherein said closure means has an outwardly facing face, and further comprising a handle movably connected to said closure means, wherein said closure means is profiled to seat said handle in a generally flush relationship with said outward facing face of said closure means.

11. A chute according to claim 1 wherein said closure means is hingeably connected to said peripheral wall and wherein said frame has means for holding said closure means flush with said flange when said closure means is moved to cover said inlet.

12. A chute according to claim 1 wherein said tube is sufficiently flexible that it may be packed into said frame.

13. A chute according to claim 8 wherein said tube is sufficiently flexible that it may be packed into said frame.

14. A chute according to claim 11 wherein said closure means has an outwardly facing face, wherein said tube is sufficiently flexible that it may be packed into said frame, and further comprising a handle movably connected to said closure means, wherein said closure means is profiled to seat said handle in a generally flush relationship with said outward facing face of said closure means.

* * * * *